United States Patent [19]
Thornton et al.

[11] Patent Number: 4,555,331
[45] Date of Patent: Nov. 26, 1985

[54] SELF-METERING SEMI-AUTOMATIC QUANTITATIVE FILTRATION ASSEMBLY

[75] Inventors: Michael G. Thornton; Benton C. Clark, III, both of Littleton, Colo.

[73] Assignee: Martin Marietta Corporation, Bethesda, Md.

[21] Appl. No.: 696,863

[22] Filed: Jan. 30, 1985

Related U.S. Application Data

[63] Continuation of Ser. No. 556,029, Nov. 29, 1983, abandoned.

[51] Int. Cl.⁴ ............................................. G01N 15/04
[52] U.S. Cl. ................................. 210/99; 73/61 R; 210/100; 210/248; 210/254; 210/257.1; 210/258; 210/406; 210/416.1
[58] Field of Search .................. 73/61 R; 137/456; 210/97, 100, 406, 416.1, 99, 248, 254, 257.1, 258

[56] References Cited

U.S. PATENT DOCUMENTS

| | | | |
|---|---|---|---|
| 1,349,798 | 8/1920 | Yeoman | 210/406 X |
| 2,225,984 | 12/1940 | Erekson | 210/406 X |
| 2,307,318 | 1/1943 | Kinney | 210/406 X |
| 2,597,350 | 5/1952 | Lucas | 73/61 R |
| 3,236,094 | 2/1966 | Steinmeyer | 73/61 R |
| 3,271,999 | 9/1966 | Dwyer et al. | 210/416.1 X |
| 3,731,806 | 5/1973 | McCormick | 210/406 X |
| 3,782,175 | 1/1974 | Roman | 73/61 R |
| 3,900,290 | 8/1975 | Hornstra | 73/61 R |
| 4,020,676 | 5/1977 | Nuxhall et al. | 73/61 R |
| 4,069,705 | 1/1978 | Burr | 73/61 R |
| 4,150,925 | 4/1979 | Perkins | 137/456 |
| 4,227,398 | 10/1980 | Keirns et al. | 73/61 R |

Primary Examiner—Richard V. Fisher
Assistant Examiner—W. Gary Jones
Attorney, Agent, or Firm—Yount & Tarolli

[57] ABSTRACT

A semi-automatic quantitative filtration assembly is disclosed having a measuring means to measure and present a known quantity of fluid for filtering and a fluid holding means adjacent to a filter medium. The fluid holding means is adapted to receive and hold excess fluid during filtering and to prevent intermixing with a known quantity of fluid to be presented to filtering. The filtering apparatus is designed to filter a quantitative amount of fluid and receive fluid in the fluid holding tank which is excess sample fluid or fluid unwanted as a result of error or operational failure and which drains to a common vacuum/waste means for filtered fluid. A variety of features are also provided to insure proper operation and minimize operator error.

34 Claims, 12 Drawing Figures

SELF-METERING SEMI-AUTOMATIC QUANTITATIVE FILTRATION ASSEMBLY

GOVERNMENT RIGHTS

The government has rights in this invention pursuant to Contract No. F33615-80-C-2071 awarded by the U.S. Air Force.

This is a continuation of co-pending application Ser. No. 556,029 filed on Nov. 29, 1983, now abandoned.

FIELD OF THE INVENTION

The present invention relates to a filtering apparatus designed to semi-automatically accomplish repetitive quantitative filtration.

BACKGROUND OF THE INVENTION

In current practice, quantitative filtration is usually accomplished by a lab technician using glassware items, tubing, a vacuum pump, tweezers, a ring stand, a pipette, petri dishes, and disposable pipette tips. The generally accepted procedure is as follows: with a special flat-bladed tweezer, a filter is carefully removed from between its protective sheets. With a special rolling motion, the filter is laid across a fritted glass filter stoppered into an Erylenmeyer side-arm vacuum glass. A cylinder with a flared, ground-glass base is carefully set over the filter and centered. A spring loaded clamp is then squeezed over the fritted glass and flared base of the cylinder to rigidly hold the system together. A sample of oil is taken using a pipette technique and squirted into the cylinder. Vacuum is applied and the progress of the filtration is monitored visually by the technician. Disassembly requires removal of the spring clamp, followed by carefully lifting the filter and placing it in an individual petri dish. Clean up requires a wash bottle and a waste container and sink.

Some attempts have been made to automate the foregoing processes. See for example, Nuxhall U.S. Pat. No. 4,020,676. However, Nuxhall represents a fairly complicated apparatus and does not provide a simple measuring means or an in-process holding tank to collect and hold unwanted fluids. Nuxhall also does not have a cover to prevent fluid introduction at inappropriate times. The need still exists for a simple system designed to minimize operator error and to simplify obtaining the desired quantity of fluid to be filtered.

SUMMARY OF THE INVENTION

The filtering apparatus of the present invention includes a simple measuring means to measure and present a known quantity of fluid for filtering. The present invention also has an in-process fluid holding tank adjacent to a filter medium. The in-process fluid holding tank is adapted to receive and hold excess fluid during filtering to prevent the excess fluid from intermixing with the known quantity of fluid to be filtered. The in-process fluid holding tank receives unwanted fluid as a result of operator error, e.g., if the operator puts too much fluid into the filtering apparatus, or operational failure (e.g., if the filter plugs). The holding tank drains into the same vacuum/waste means which draws the filtered fluid through the filter medium. The measuring means is moved into and out of engagement with the filter medium and has an overflow passage to remove excess fluid from the measuring means for subsequent delivery into the in-process holding tank. Delivery of fluid from the in-process fluid holding tank is controlled by a drain and an outlet valve.

Mechanical interlock means are incorporated into the filtering apparatus to prevent—in conjunction with a removable cover—the addition of fluid into the filtering apparatus unless the filtering apparatus is in condition to receive and filter same. Specifically, the filter apparatus includes a movable measuring tube which moves into engagement with the filter medium. The mechanical interlock prevents the addition of fluid into the filtering apparatus unless the measuring tube is in engagement with the filter medium.

A slidable carrier and a frame for holding the filter medium are provided to ease handling of the filter medium. The slidable carrier is locked in position during filtering. Additional mechanical interlocks are provided to insure proper location of the filter medium and measuring tube and registry of the filter medium on the slidable carrier.

Additional features of the present invention include coarse metering to insure sufficient fluid to make up the known quantity of fluid in the measuring means. A rinse means and rinse cycle are also provided.

Various sensors and microswitches may be used to sense positioning of the slidable carrier for motor-driven applications, and for sensing the end of the vacuum cycle during filtering.

The advantages of the present invention are that it automates nearly all of the conventional manual filtration process steps, thereby improving reproducibility of the results and throughput efficiency. An operator need not be versed or skilled in chemical laboratory techniques in order to obtain good results. Some specific advantages include:

(a) the filtering apparatus is a self-contained unit with all needed items except prepackaged filters;

(b) the filtering apparatus is compact and takes up less space than laboratory apparatus;

(c) no breakable glassware is included;

(d) disposable pipette tips are no longer required;

(e) special laboratory techniques which are eliminated include pipetting, tweezer handling of filters, manual rinse, and manual detection of filtration completion;

(f) operator involvement is minimized, allowing the operator to accomplish other tasks during filtration;

(g) throughput efficiency for filtering is faster because the number of operator steps is grealy reduced; and (h) reproducibility of results no longer depends on the skill, consistency, and patience of individual technicians.

BRIEF DESCRIPTION OF THE DRAWINGS

The present invention will become more apparent to one skilled in the art upon a consideration of the following description taken in connection with the accompanying drawings wherein.

DESCRIPTION OF PREFERRED EMBODIMENT

Figure 1:
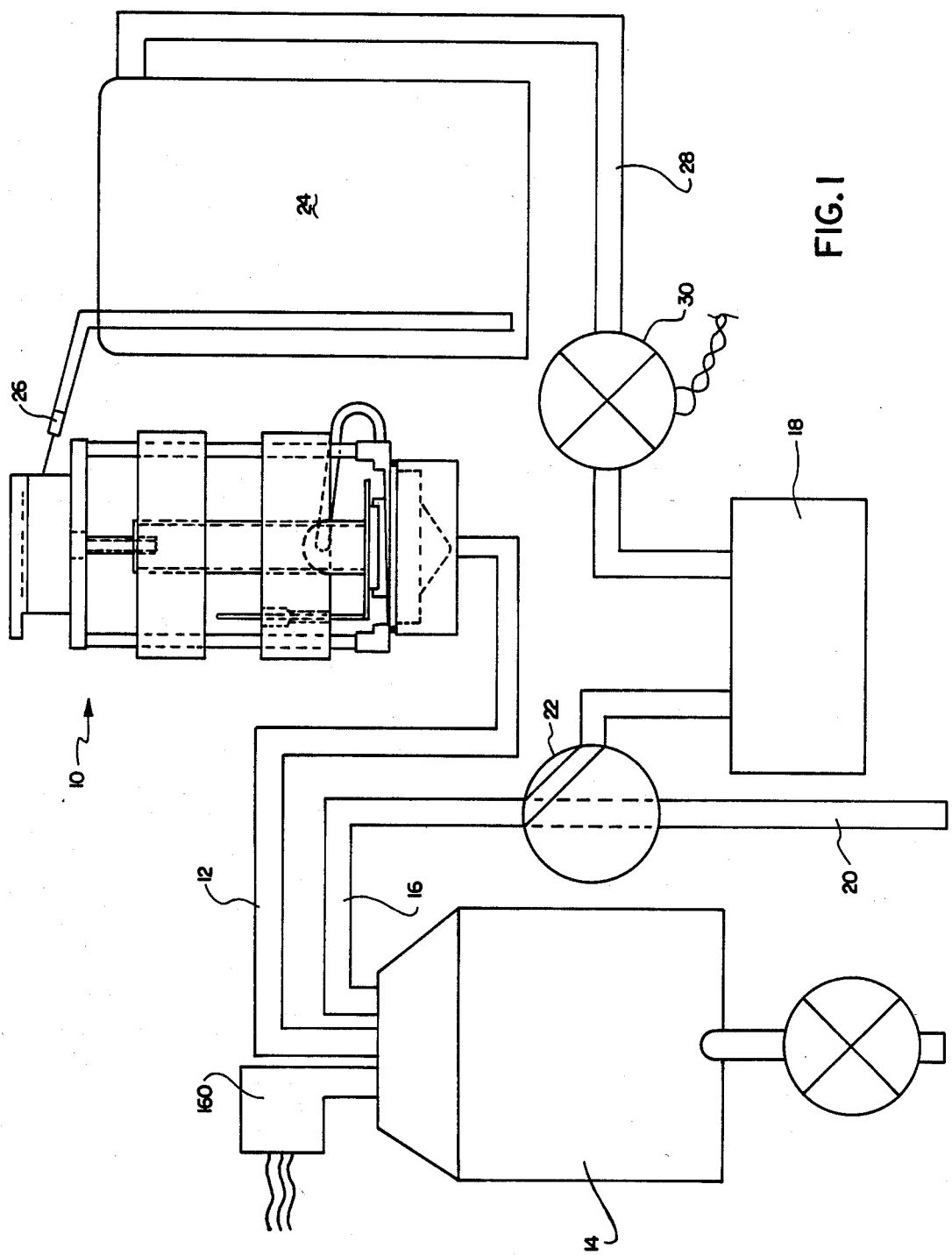
FIG. 1 is a schematic illustration of a total system embodying the present invention in one form.

A total filtration system embodying the present invention in one form is schematically shown in FIG. 1. A quantitative filtration system 10 of the present invention is connected to a vacuum system through a first passage or means to apply a vacuum 12 leading to a waste fluid holding tank 14 for filtered fluid. A second passage 16 draws a vacuum from the quantitative filtration assembly 10 through passage 12 and waste holding tank 14. The vacuum is applied by either a portable vacuum pump 18 or through port 20 to an auxiliary vacuum system. A valve 22 is provided to connect the filter assembly 10 up to either the portable vacuum pump 18 or the auxiliary vacuum system through port 20.

A rinse fluid holding tank 24 is connected to the quantitative filtration system 10 through an injection port 26. The rinse fluid holding tank 24 is pressurized by taking the pressure outlet from the vacuum pump 18 through line 28. A valve 30 is provided in the rinse fluid line 28.

Figure 3:
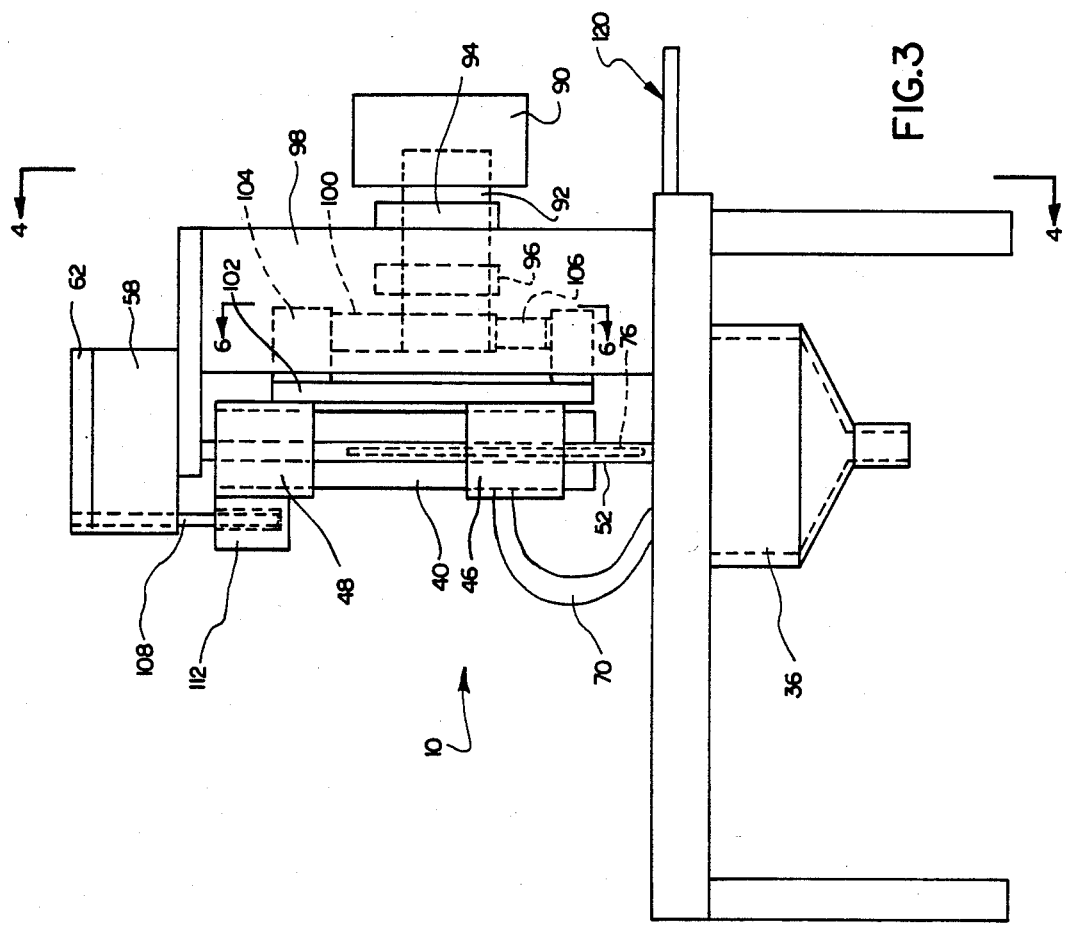
FIG. 3 is a side plan view of the filtration assembly of FIG. 2.
Figure 2:
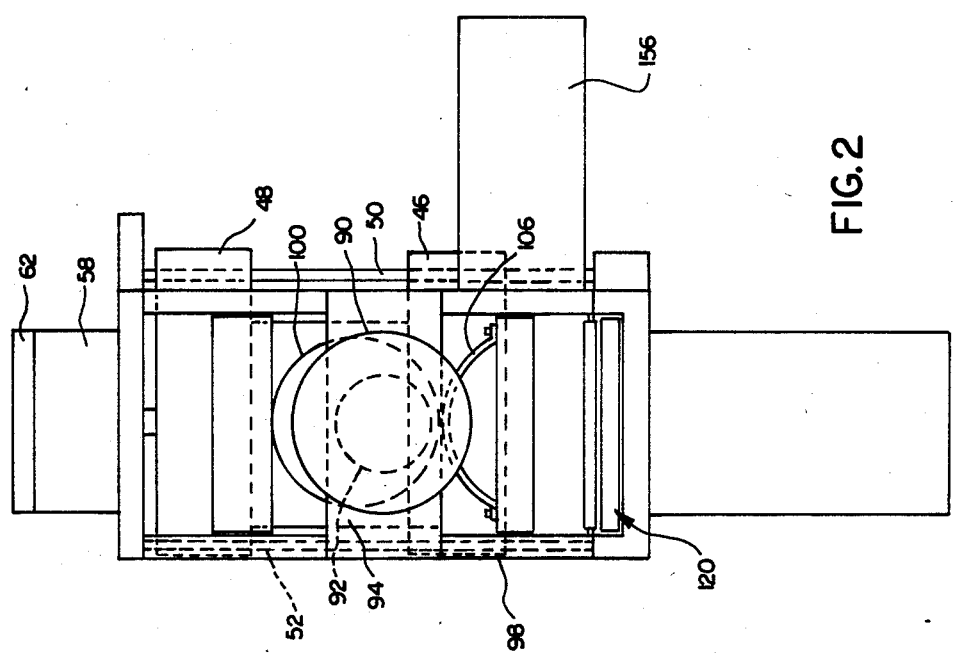
FIG. 2 is a front plan view of a filtration assembly according to one form of the present invention.
Figure 4:
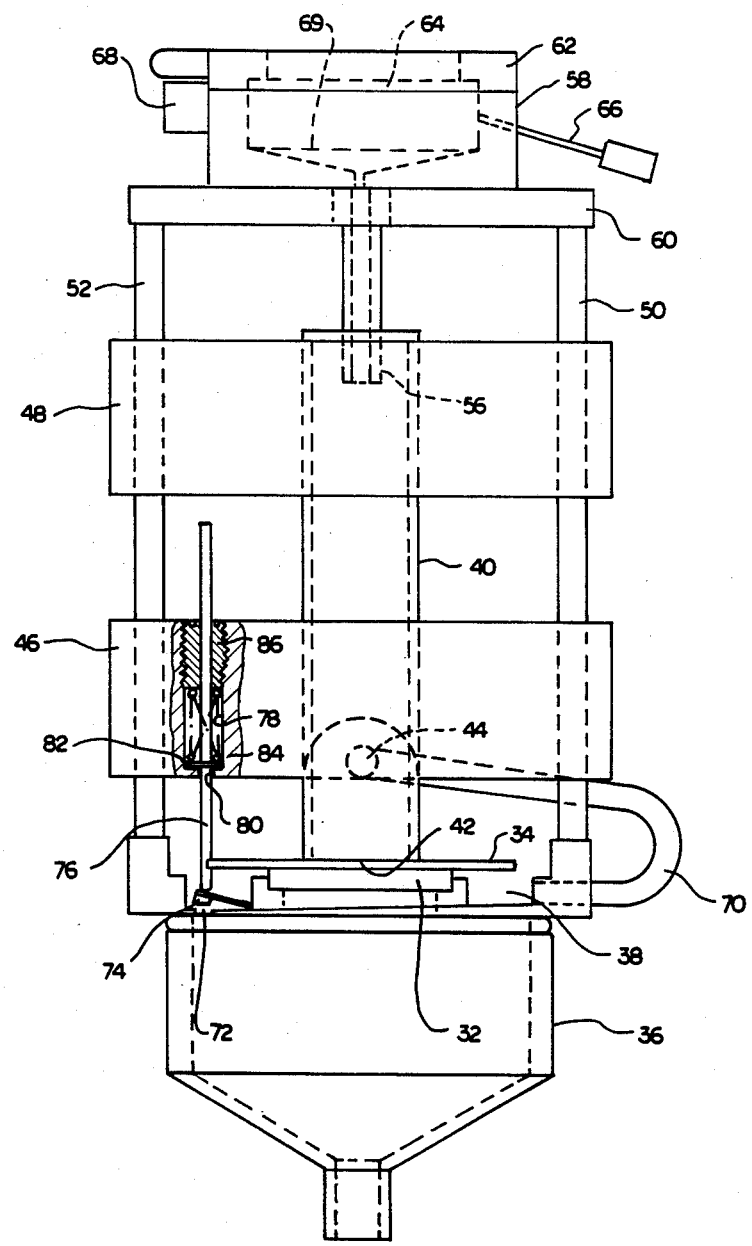
FIG. 4 is a schematic front view taken along line 4—4 of FIG. 3, with parts removed for clarity.

With reference to FIGS. 2–4, the major internal working parts of the quantitative filtration assembly 10 will now be explained. A filter assembly is provided with a filter support 32. The filter support 32 is preferably a fritted glass material, but may be any other suitable filter support, such as a wire mesh. The filter support 32 is adapted to support a filter medium 34. Depending on the fluid to be filtered, the filter medium may be any suitable filter medium. In the preferred use of the present invention in filtering metallic wear particles from engine oil, an anisotropic filter (i.e., unidirectional) is preferred. A slidable carrier and frame means for holding the filter medium 34 (not shown in FIG. 4) will be explained in more detail below.

A vacuum is drawn through the filter support 32. The vacuum system includes a suction funnel 36 which is connected to the vacuum system and is adapted to draw a vacuum through the filter support 32.

An in-processing fluid holding tank 38 is provided. The in-processing fluid holding tank 38 is adjacent and below the filter support 32 in the preferred form. The in-process fluid holding tank is adapted to receive at least a portion of a known quantity of fluid positioned above a filter medium in the event a portion of the known quantity of fluid is unable to pass through the filter medium and must be released. In this manner, excess sample fluid or fluid unwanted as a result of error or operational failures can be easily collected and removed. In the preferred form, the in-process fluid holding tank 38 is a moat which surrounds the filter support 32 and is positioned below the filter support 32.

Above the filter medium 34 is a measuring means 40. The measuring means 40 measures and presents a known quantity of fluid for filtering. In the preferred form of the present invention, the measuring means 40 is a metering tube. The metering tube 40 has an open end 42 which is adapted to engage the filter medium 34. A fixed distance above the open end 42 of the metering tube 40 is an overflow or outlet passage 44. In this manner, when the metering tube 40 engages the filter medium 34 a known volume exists in the lower end of the metering tube 40 between the end 42 and the outlet passage 44. Thus, the metering tube 40 is designed to hold a known quantity of fluid for filtering between the end 42 and the overflow passage 44. Metering tube 40 is secured into two metering blocks 46 and 48. The metering blocks 46, 48 together comprise part of the means to move the metering tube 40 into and out of engagement with the filter medium 42. The metering blocks 46, 48 are guided for movement on two guides or shafts 50 and 52. The two metering blocks can also be made as a unitary member.

The inlet funnel assembly 58 is provided with a slidable cover 62, which has a viewing glass 64 in the center thereof. The slidable cover 62 pivots or slides on a pin near the perimeter of the inlet funnel 58 so as to allow the addition of fluid into the funnel. The inlet funnel assembly 58 is also provided with an injection port 66 which permits the injection of rinse fluid into the inlet funnel. The inlet funnel cover 62 is also provided with a rinse safety interrupt switch 68 which automatically stops the addition of rinse fluid through rinse injection port 66 if the slidable cover 62 is opened during the rinse cycle of the filtering apparatus 10. The inlet funnel 58 is also provided with a coarse metering line 69 which will be explained in more detail below.

The outlet passage 44 in the metering tube 40 leads to an overflow tube 70 which drains by gravity into moat 38. As shown in FIG. 4, the moat 38 is sloped toward an outlet 72 which in turn is controlled by an outlet valve 74. The outlet valve 74 for the moat drain 72 is a normally-open valve which is closed by moat pin 76 acting against the valve. The outlet valve 74 uses a leaf spring to bias the valve to a normally open position. Moat pin 76 is a spring biased pin secured within the lower metering block 46. The moat pin 76 travels in conjunction with the metering tube 40.

A breakaway in FIG. 4 shows that the moat pin 76 is spring loaded in the following manner. The lower metering block 46 contains a bore 78 therethrough. The bore 78 has a narrow end 80 with an opening only big enough to allow passage of the pin 76. A collar 82 attached to the moat pin 76 acts against a spring 84. A set screw 86 determines the tension on the spring at rest. When the moat pin 76 comes in contact with the outlet valve 74, movement of the metering blocks 46, 48 will tend to move the moat pin 76 downwardly under pressure against the outlet valve 74. Upward movement of the moat pin 76 is resisted by the spring 84, thus biasing the moat pin 76 by spring tension against the outlet valve 74.

A part of the means for moving the metering blocks 46, 48 together with the metering tube 40 into and out of engagement with the filter medium 34 will be explained with reference to FIG. 5. An outer knob 90 is connected to a shaft 92. The shaft 92 is supported for rotation through openings in a front support 94 and a second inner support 96. Supports 94 and 96 are in turn connected to side frames 98 as seen in FIGS. 2 and 3. Secured to the other end of shaft 92 is a cam 100. The cam 100 is mounted eccentrically about shaft 92.

Figure 6:
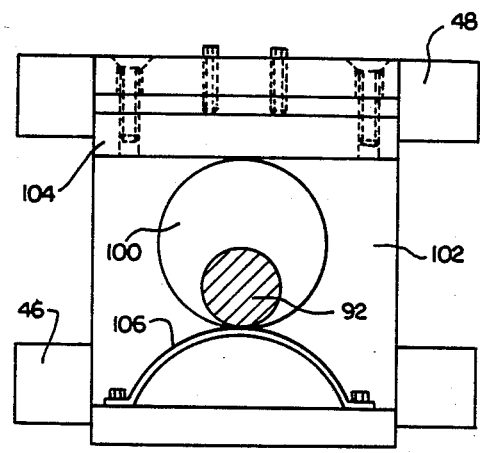
FIG. 6 is a partial, schematic cross section taken along line 6—6 of FIG. 3.

As seen in FIG. 6, cam 100 engages a block 102 which in turn is secured to metering blocks 46, 48. Cam 100 engages a projecting surface 104 from the block 102, and cam 100 is biased against said surface 104 by a spring 106. If desirable, blocks 102, 46 and 48 could be a unitary member so long as member 104 is adjustable to allow tension adjustment between metering tube 40 and filter medium 34.

Figure 5:
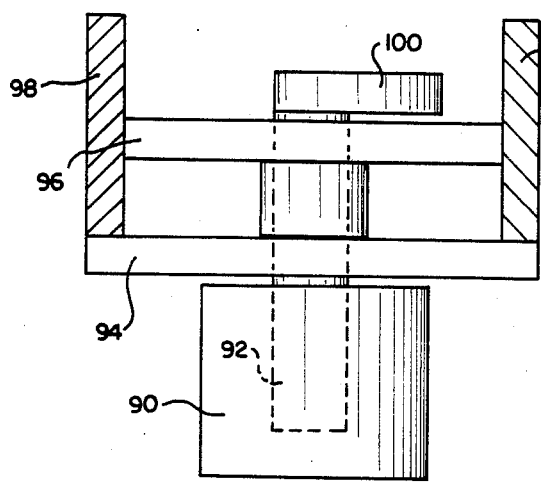
FIG. 5 is a top plan schematic view of the control and cam assembly of the filtration assembly shown in FIG. 2.

As is clear from FIGS. 4-6, rotation of knob 90 moves cam 100 eccentrically about shaft 92. Rotation of the cam 100 against the block 104 attached to metering blocks 46, 48 by means of plate 102, causes movement of the metering tube into and out of engagement with the filter medium 34. One advantage of using cam 100 is that knob 90 may be moved in either direction to raise or lower the metering tube 40. If desirable, a mechanical stop can be used limiting rotation of the knob 90 in only one direction and through only 180°.

The cam mechanism shown in FIGS. 5 and 6 is one suitable method for raising and lowering the metering tube 40. Other suitable arrangements could be employed, such as a rack and pinion.

Figure 7A:
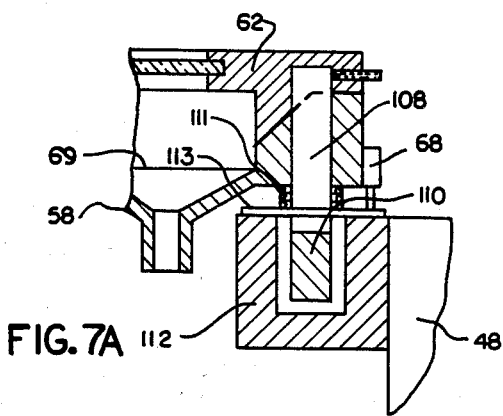
FIGS. 7A–7B schematically illustrate a mechanical interlock for the cover of the filtration assembly shown in FIG. 2.
Figure 7B:
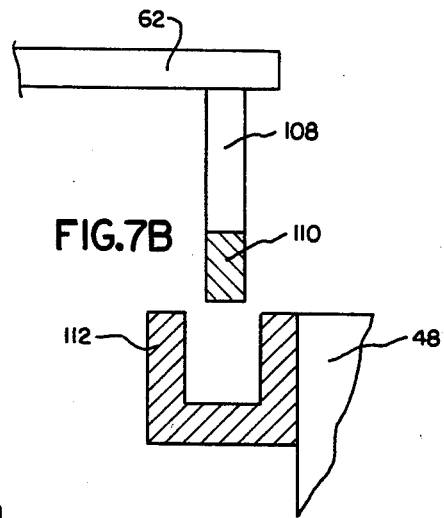

The slidable cover 62 is provided with mechanical interlock which is schematically shown in FIGS. 7A-B. At one edge of the slidable cover 62, a pin 108 is secured thereto. At the lower end of pin 108 is a projecting flange 110. Secured to the filtration apparatus adjacent the upper metering block 48 is a slotted receptacle 112. FIG. 7A schematically shows the metering block 48 in its upper position. When the metering block 48 is in its upper position, the slotted receptacle 112 receives the projecting flange 110 of the slidable cover 62. When the slidable cover 62 is in place covering the inlet funnel assembly 58 and the metering block 48 is in its upper position as shown in FIG. 7A, the mechanical interlock between parts 110 and 112 prevents removal of the slidable cover 62. That mechanical interlock prevents the introduction of fluid when the metering tube 40 is in its upper position and, thus, not ready to accept addition of sample fluid because tube 40 is not engaged with filter medium 34. The pin 108 is provided with a spring 111 and a washer 113. The spring 111 causes the funnel cap to seal with the funnel tight enough to prevent solvent from coming out during the rinse cycle. The up and down movement of the washer 113 provides actuation of switch 68 when the funnel cap is opened. The upward movement of funnel cap 62 is caused by the lower edge of the funnel cap moving over a corresponding edge on the funnel.

FIG. 7B shows the metering block 48 in its lower position when metering tube 40 is adjacent and engaging the filter medium 34. Disengagement of parts 110 and 112 deactivates the mechanical interlock and permits an operator to remove the slidable cover 62 to add sample fluid for filtering.

Figure 8:
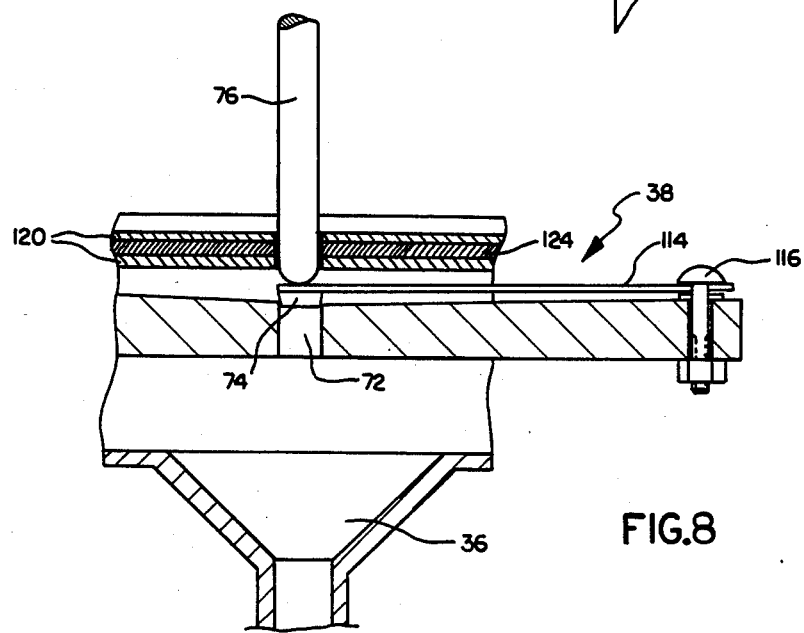
FIG. 8 is an enlarged cross section of the moat pin and moat valve employed in one form of the present invention.

The operation of the moat pin 76 and the moat outlet valve 74 will be described in more detail in conjunction with FIG. 8, which schematically shows the moat pin 76 in its lower position biasing outlet valve 74 to its closed position over drain outlet 72. The lower floor of moat 38 slopes toward drain outlet 72. Along one side of the moat 38 a leaf spring 114 is attached to the moat outlet valve 74. The leaf spring 114 is secured to a support 116 such that without any pressure on outlet valve 74, the leaf spring 114 biases outlet valve 74 away from drain 72.

The outlet drain 72 leads to the suction funnel 36 which is the same outlet waste passage for filtered fluid drawn through the filter medium 34.

In addition to moat pin 76 serving as a means of closing the moat outlet valve 74, the moat pin 76 also serves to insure that the filter medium 34 is properly placed between metering tube 40 and filter support 32 before the metering tube 40 is lowered. As shown in FIG. 8, and also FIG. 10, a slidable carrier 120 is provided. The slidable carrier 120 has grooved side channels for receiving the filter medium 34 mounted in a filter holder or frame 124. For convenience, the filter holder 124 can be a conventional 35 mm slide holder. A recess or hole 126 is provided in the slidable carrier 120, and it is designed to allow moat pin 76 to register therewith. Similarly, a recess or notch 128 is provided in one edge of filter frame 124.

The moat pin 76 helps insure proper placement of the filter medium 34 and prevents undesired operation of the filtration assembly. Unless the slidable carrier 120 and the filter frame 124 are in proper registry, the moat pin 76 cannot pass through the opening 126 in the slidable carrier 120 or the notch 128 in the filter frame 124. If the moat pin 76 cannot pass through those recesses 126, 128, the operator will be unable to lower the metering blocks 46 and 48 because the moat pin 76 wll prevent complete lowering of the metering blocks and the metering tube 40. If the metering tube 40 and the metering blocks 46, 48 are not lowered into their lowermost position so that metering tube 40 engages filter medium 34, the mechanical interlock 110, 112 on the cover 62 will prevent the operator from adding fluid to the inlet funnel 58. Thus, the moat pin 76 is designed to insure in conjunction with the slidable carrier 120 and the filter frame 124 that the apparatus 10 is ready for operation and the filter is in place before any fluid is added to the system.

Figure 9:
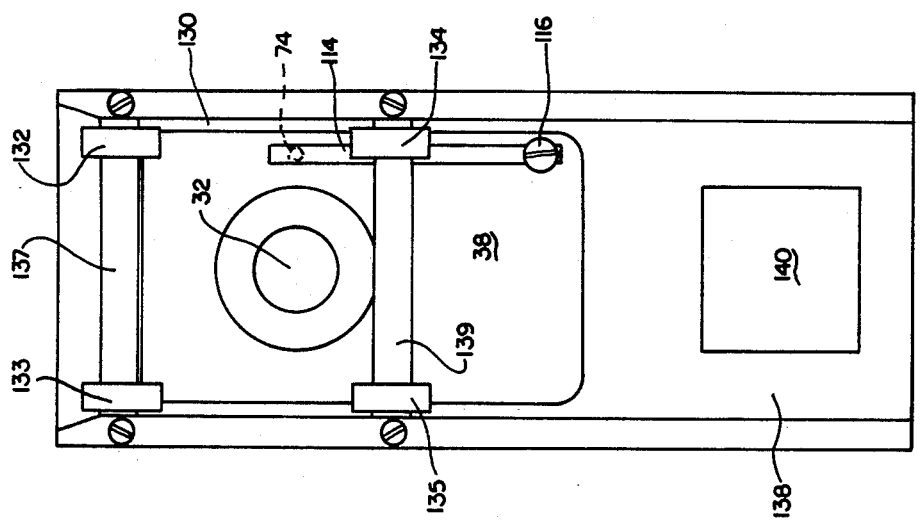
FIG. 9 is a top plan view of the in-process holding tank or moat employed in the filtration assembly of FIG. 2.

FIG. 9 is a top plan view of the moat 38 surrounding the filter support 32 and being located below filter support 32. The slidable carrier 120 slides along surface 130 above the moat 38. Two sets of rollers 132-3 and 134-5 are provided on either side of filter support 32 and spaced above the surface 130 and from each other by space bars 137, 139. The slidable carrier 120 slides between the rollers and surface 130. The purpose of the rollers 132 and 134 is to serve both as a guide for the slidable carrier and also to prevent vertical movement of the slidable carrier relative to the filtration assembly. The purpose of the separate rollers 132 and 133 (and also 134-5) provide clearance for the optional insertion of thick samples and transport to the analysis area 140.

If desired, the moat is provided with an extension 138. The purpose of the extension 138 is to provide a second opening 140 for analysis of any materials retained on the filter medium 34. For example, after the filter medium 34 is removed from the filtering station above filter support 32, the slidable carrier 120 can be moved to position the filter medium 34 over opening 140 for analysis. One type of analysis could be an X-ray analysis of wear metal particles in engine oil.

Figure 11:
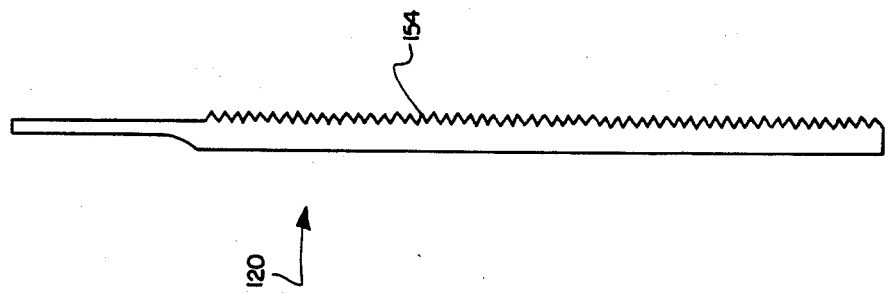
FIG. 11 is a side plan view of the carrier shown in FIG. 10.
Figure 10:
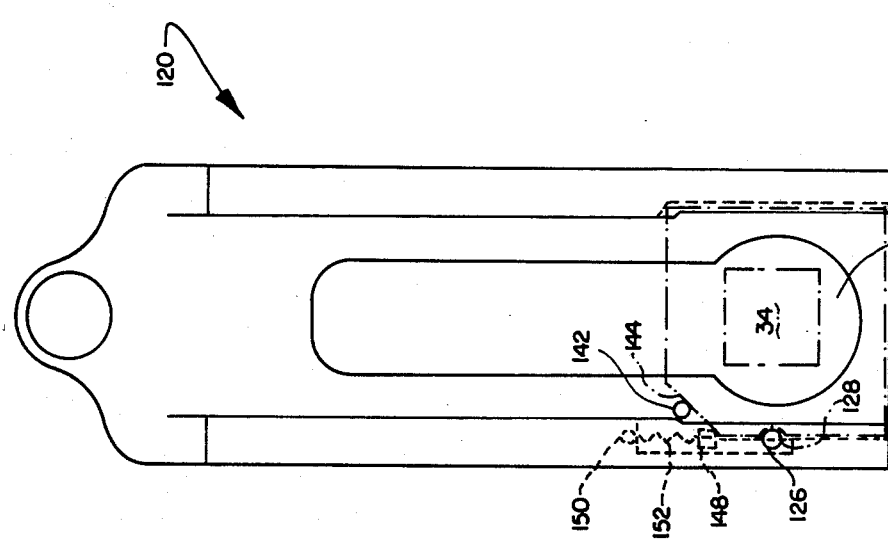
FIG. 10 is a bottom plan view of a slidable carrier and filter medium frame for the filtration assembly of FIG. 2.

FIGS. 10 and 11 illustrate the slidable carrier 120 of the present invention in more detail. When using an anisotropic filter, the present invention can be adapted to insure that the filter medium 34 is placed in its proper orientation in the slidable carrier 120. A blocking screw 142 may be positioned in the channel in the slidable carrier 120 for receiving the filter frame 124. If the filter frame 124 is notched at one corner 144, then the filter frame 124 can only be placed in one orientation in the slidable carrier 120 which will permit the notch 128 in the frame 124 to be in registry with the opening 126 in the slidable carrier 120. The metering tube 40 cannot be brought into engagement with the filter medium 34 unless the filter frame 124 containing the filter medium is properly placed within the slidable carrier 120.

The present invention can also be adapted to prevent inadvertent filtering when no filter medium is in place. A blocking mechanism 148 can be added to the slidable carrier and biased away from a fixed stop 150 by a spring 152. The spring 152 and the blocking means 148 should be positioned so that when the spring is at rest, the blocking means 148 covers the recess 126 in slidable carrier 120. If no filter frame 124 is positioned properly in slidable carrier 120, the blocking means 148 would prevent the moat pin 76 from passing through recess 126 and therefore prevent operation of the apparatus. Thus, filter operation is only possible when filter frame 124 is properly positioned in slidable frame 120 with the filter frame 124 pushing the blocking means 148 away from its blocking position at recess 126 in slidable carrier 120.

As shown in FIG. 11, the upper surface of slidable carrier 120 may be provided with a gear rack 154. The gear rack 154 is designed to engage a pinion gear attached to motor 156. Thus, if motorized movement of the slide 120 is desired, the motor 156 and the gear rack 154 may be utilized. If manual operation of the slidable carrier 120 is desired, scribes on the upper surface of carrier 120 can be provided to mark proper positioning of the carrier relative to the filtration assembly frame.

The operating sequence of the filtration assembly 10 of the present invention will now be described. The slidable carrier 120 is removed from the filtration assembly, and the filter frame 124 with a properly mounted filter medium 34 is inserted into the carrier 120. If anisotropic filters are used, the proper orientation of the filter must be achieved. Blocking means 148 will prevent operation of the apparatus unless a filter frame 124 is properly placed in the frame 120. Blocking screw 142 will insure proper orientation of an anisotropic filter. When the metering blocks 46, 48 are in their upper position, the slidable frame 120 with the properly oriented filter medium 34 is placed underneath rollers 132, 134 into the apparatus 10 until opening 126 is positioned over outlet valve 74. Proper registry between the notch 128 in the filter frame 124 and the outlet valve 74 with moat pin 76 is necessary before the metering tube 40 can be lowered. While the metering blocks 46, 48 are in their raised position, the mechanical interlock 110, 112 prevents removal of the slidable cover 62 and therefore addition of any fluid into the apparatus. When the slidable carrier 120 is properly positioned, the knob 90 can be rotated to lower the metering blocks 46, 48 and tube 40 so that metering tube 40 engages the filter medium 34. When the metering tube is properly engaged with the filter medium, the slidable cover 62 can be removed.

The present invention is designed to insure adequate addition of sample to provide sufficient fluid for measuring a known quantity of fluid in the lower end of metering tube 40. Coarse metering is provided by the scribe 69 in inlet funnel 58 and the structure of inlet funnel 58. Accurate and reproducible coarse metering occurs provided that the filter is sufficiently impermeable so that negligible filtration occurs during coarse and final metering. This is easily accomplished in most cases as long as no vacuum is applied. Coarse metering is obtained by pouring sufficient sample in the inlet funnel 58 until it reaches the scribe 69. The length and the shape of the outlet 56 of the inlet funnel 58 are adjusted to slow delivery of the liquid to the metering tube 40. With suitable adjustments of the scribe 69 and the structure of the inlet funnel for the viscosity of various fluids, it is possible to obtain predictable coarse metering. Coarse metering also tends to be self-compensating: if a person pours fast, the person tends to fill somewhat above the scribe 69 before stopping; if a person pours slowly, a certain portion of the liquid will already have passed through the inlet funnel. Coarse metering has found to be accurate and reproducible and permits conservation of sample fluid while assuring a sufficient supply for the final metering at the lower end of the metering tube 40.

The final metering at the lower end of metering tube 40 is accomplished by allowing the sample fluid to fill the known volume between the open end 42 of the metering tube 40 and the outlet passage 44. Any fluid in excess of the known quantity of fluid to be filtered flows out passage 44 through overflow passage 70 into moat 38. At that point, moat pin 76 has closed outlet valve 74 and the excess fluid is retained in the moat 38 and not intermixed with the sample fluid.

The inlet cover 62 is closed and the vacuum is applied to the system. As the vacuum is applied to the suction funnel 36, filtered fluid is drawn through the filter support 32 into waste line 12 and into a waste holding tank 14. A vacuum transducer 160 (FIG. 1) on waste holding tank 14 can be provided to sense an increase in pressure and thus an indication that the known quantity of fluid in metering tube 40 has passed through the filter. The vacuum transducer 160 can be designed to automatically shut off the vacuum system indicating completion of filtration.

After the completion of filtration, the rinse cycle commences. Rinse fluid is inroduced from rinse fluid holding tank 24 through injection port 66 into inlet funnel 58. The round inlet funnel 58 in conjunction with the angle injection port 66 produces a swirling rinse to completely rinse out the apparatus and insure that residual sample fluid of the known quantity of fluid on the walls of metering tube 40 is passed through the filter medium 34.

At the completion of the rinse cycle, the metering blocks 46, 48 can be raised. Raising the metering blocks in turn raises the moat pin 76 which allows any excess fluid in the moat 38 to drain into the same suction funnel and waste line as the filtered fluid.

The in-process holding tank or moat 38 of the present invention serves several purposes. First, it serves to hold any excess sample fluid flowing out of the overflow passage from the metering tube 40, and it prevents the excess fluid from intermixing with the known quantity of fluid to be filtered. Second, the moat 38 is designed to receive any fluid that spills as a result of operator error or operational failure. Third, the moat 38 is designed to receive fluid in the event the filter medium 34 becomes plugged and filtration cannot be completed. In that event, the metering tube 40 would have to be raised even though a quantity of fluid still remains in the lower end thereof. When the metering tube is raised, any remaining fluid in metering tube 40 simply flows into the moat 38. Another feature of the moat 38 is that the fluid therein drains into the same waste system using the same line and vacuum system as the fluid filtered through the filter medium 34.

During the solvent rinse, it is possible to slide the cover 62 off of the inlet funnel 58 because of disengagement of the mechanical interlock 110, 112. In that event, a rinse safety interrupt switch 68 may be provided to shut off the flow of rinse fluid.

Another feature of the present invention is that, during the filtering cycle, movement of the filter medium 34 is minimized. The rollers 132-135 prevent vertical movement of the filter medium 34 relative to the filter support 32 and the metering tube 40. The moat pin 76—as a result of its engagement in opening 126 in slidable carrier 120—prevents linear movement of the slidable carrier 120.

Another feature of the present invention is that a filter frame 124 is provided to minimize handling of the filter paper. Many filter media or papers are very fragile and utilization of a filter frame 124 minimizes damage and contamination of the filter medium during handling. Framed filters may also be easily stored for future reference and cataloging.

Another feature of the present invention is the structure of the slidable inlet cover 62. The purpose of the slidable cover 62 is threefold: First, during the rinse cycle, rinse fluid is pumped through the angled injection port 66 up against the cover to produce a dispersion and a swirling action; second, the cover prevents splash-out during rinse; and third, the inlet cover prevents through the mechanical interlock 110, 112, any introduction of sample at an inappropriate time.

The filtration assembly of the present invention can be operated either manually or with a motorized drive using the rack and pinion gear shown in FIG. 11. The motor can be electrically interlocked through microswitches to prevent operation of the motor unless the metering block is in the upper or clear position. Automatic position monitoring of both the slidable carrier 120 and the metering tube 40 can be achieved by mechanically operated switches or by strategically placed phototransducers. An additional positioning function is served by the moat plug pin 76, which must pass through the recess 126 in the slidable carrier 120.

What is claimed is:

1. A filtering apparatus comprising:
   means for supporting a filter medium,
   measuring means to measure and to present a known quantity of fluid to a filter medium,
   means to apply a vacuum to draw said known quantity of fluid through a filter medium,
   said means to apply a vacuum including waste means to receive fluid drawn through a filter medium,
   a fluid holding means adjacent and below a filter medium having means (i) for receiving and holding fluid in excess of said known quantity, which excess fluid does not pass through a filter medium and (ii) for receiving at least a portion of said known quantity of fluid positioned above a filter medium in said measuring means, which said portion of known quantity of fluid cannot pass through a filter medium,
   said means for receiving comprising an inlet into said fluid holding means spaced laterally from a filter medium, and
   outlet means in said fluid holding means for draining said fluid holding means into said waste means.

2. A filtering apparatus as claimed in claim 1 including means to move said measuring means into and out of engagement with a filter medium, said measuring means having means for releasing any fluid therein into said fluid holding means when said measuring means is moved out of engagement with a filter medium.

3. A filtering apparatus as claimed in claim 2 wherein said measuring means comprises a metering tube having an open end for engagement with a filter medium and a lateral opening in the wall of said metering tube spaced a known distance from said end of said tube, a volume contained in said tube between said end and said lateral opening constituting a known volume and receiving said known quantity of fluid for filtering, and said lateral opening being positioned to receive any excess fluid.

4. A filtering apparatus as claimed in claim 2 wherein said measuring means includes overflow means to deliver fluid in excess of said known quantity to said fluid holding means.

5. A filtering apparatus as claimed in claim 4 including means to release fluid through an outlet valve in said outlet means when said measuring means is moved out of engagement with a filter medium, whereby excess fluid in said fluid holding means is transmitted through said outlet valve to said waste means.

6. A filtering apparatus as claimed in claim 5 wherein said fluid holding means comprises a moat surrounding and being below a filter medium, said overflow means comprises an overflow opening in said measuring means and an overflow tube for delivering fluid in excess of said known quantity to said moat, said outlet means comprising a drain in the bottom surface of said moat, and said outlet valve means comprising a moat valve to control passage of fluid into said drain.

7. A filtering apparatus as claimed in claim 4 including coarse metering means connected to said measuring means to insure sufficient fluid to constitute said known quantity of fluid, said coarse metering means having means to allow sufficient fluid to fill said measuring means and to allow any excess fluid flow into said overflow means and into said fluid holding tank.

8. A filtering apparatus as claimed in claim 2 including means preventing addition of fluid into said filtering apparatus unless said measuring means is in engagement with a filter medium.

9. A filter apparatus as claimed in claim 8 wherein said means preventing addition of fluid comprises a cover preventing the introduction of fluid into said measuring means and a mechanical interlock to prevent opening of said cover unless said measuring means is in engagement with a filter medium.

10. A filtering apparatus as claimed in claim 2 wherein said means for supporting a filter medium comprises a filter support, a frame and a slidable carrier means for holding said frame, said carrier means including means for laterally moving said frame and filter medium over said filter support and means for positioning a filter medium between said filter support and said measuring means.

11. A filtering apparatus as claimed in claim 10 including means to prevent said slidable carrier from moving during filtering.

12. A filtering apparatus as claimed in claim 11 wherein said means to prevent said slidable carrier from moving during filtering comprises:

a pin to move in conjunction with the movement of said measuring means into and out of engagement with a filter medium, an opening in said slidable carrier for receiving said pin, said pin having an end for closing said outlet valve means in said fluid holding means, said frame holding a filter medium having a recess therein, said pin being mounted to pass through said recess and opening when in registry and to close an outlet valve means in said outlet means when said measuring means engages a filter medium, whereby movement of said slidable carrier is prevented during filtering.

13. A filtering apparatus as claimed in claim 12 wherein said slidable carrier has prevention means covering said opening therein to prevent operation of said filtering apparatus by precluding engagement of the measuring means with a filter medium thereby preventing the addition of fluid thereto unless a frame with a filter medium is properly positioned in said slidable carrier.

14. A filtering apparatus as claimed in claim 2 including rinse means for rinsing said filtering apparatus with rinse fluid after said known quantity of fluid is filtered through a filter medium, said rinse means having means to project fluid to transport any residual fluid on a wall of said measuring means to a filter medium while said measuring means is still in engagement with a filter medium.

15. A filtering apparatus as claimed in claim 14 including cycle end sensor means for sensing an increase in pressure after said known quantity of fluid is filtered through a filter medium, said cycle end sensor means shutting off any vacuum means in response to said increase in pressure.

16. A filtering apparatus as claimed in claim 15 including a round inlet funnel, a coarse metering means comprising a mark in said round inlet funnel, said round inlet funnel being connected to said measuring means, a cover for said round inlet funnel, and said rinse means including an injection port angled to swirl rinse fluid in said round inlet funnel and into said measuring means.

17. A filtering apparatus as claimed in claim 16 wherein said rinse means further includes a rinse fluid holding tank for supplying rinse during a rinse cycle and means for ceasing the flow of rinse fluid if said cover is removed during a rinse cycle.

18. A filtering apparatus as claimed in claim 2 wherein said means to move said measuring means comprises a cam, means to rotate said cam, means attached to said measuring means to engage said cam, and means to bias said cam into engagement with said means attached to said measuring means, said cam being positioned to hold said measuring means in engagement with a filter medium.

19. A filtering apparatus as claimed in claim 2 wherein said means for supporting a filter medium comprises a filter support and a frame in a slidable carrier, means for guiding said carrier, a motor positioned to engage said slidable carrier, said motor having means to laterally move said slidable carrier and frame therein into position over said filter support and to position a filter medium between said filter support and said measuring means.

20. A filtering apparatus as claimed in claim 2 wherein said means for supporting a filter medium comprises a filter support, a frame for holding a filter medium and a slidable carrier means for holding said frame and filter medium therein, said carrier means having means for moving said frame and filter medium to a first position between said filter support and said measuring means and for moving said frame and filter medium to a second position for a second operation.

21. A filtering apparatus comprising:

a slidable carrier for holding a filter medium, a filter medium support, a measuring means having an opening for engaging a filter medium, said measuring means having a known volume for receiving and holding a known quantity of fluid and having an overflow opening to remove any excess fluid placed in said measuring means, means to move said measuring means into and out of engagement with a filter medium, means to apply a vacuum to said filter support, a moat surrounding said filter support and positioned below said filter support, said moat being positioned to receive excess fluid from said overflow opening in said measuring means and being positioned to receive at least a portion of said known quantity of fluid positioned above a filter medium in said measuring means in the event said portion of known quantity of fluid is unable to pass through a filter medium and must be released, said moat including an outlet and an outlet valve to drain any fluid in said moat to said vacuum.

22. A filtering apparatus as claimed in claim 21 including means to release fluid through said outlet valve when said measuring means is moved out of engagement with a filter medium whereby excess fluid in said moat is transmitted through said outlet valve to said vacuum means as waste.

23. A filtering apparatus as claimed in claim 21 including means preventing addition of fluid into said filtering apparatus unless said measuring means is in engagement with a filter medium.

24. A filtering apparatus as claimed in claim 23 wherein said means preventing addition of fluid comprises a cover preventing the introduction of fluid into said measuring means and a mechanical interlock to prevent opening of said cover unless said measuring means is in engagement with a filter medium.

25. A filtering apparatus as claimed in claim 21 including means to prevent said slidable carrier from moving during filtering.

26. A filtering apparatus as claimed in claim 25 wherein said means to prevent said slidable carrier from moving during filtering comprises:

a pin to move in conjunction with the movement of said measuring means into and out of engagement with said filter medium, an opening in said slidable carrier for receiving said pin, said pin having an end for closing said outlet valve means in said moat, a frame for holding said filter medium, said frame having a recess therein, said pin being mounted to pass through said recess and opening when in registry and to close said outlet valve means when said measuring means engages said filter medium, whereby movement of said slidable carrier is prevented during filtering.

27. A filtering apparatus as claimed in claim 21 including coarse metering means connected to said measuring means to insure sufficient fluid to constitute said known quantity of fluid, said coarse metering means having means to allow sufficient fluid to fill said measuring means and to allow any excess fluid flow into said overflow opening and into said moat.

28. A filtering apparatus as claimed in claim 21 including rinse means for rinsing said filtering apparatus with rinse fluid after said known quantity of fluid is filtered through a filter medium, said rinse means having means to project fluid to transport any residual fluid on a wall of said measuring means to a filter medium while said measuring means is still in engagement with a filter medium.

29. A filtering apparatus as claimed in claim 28 including cycle end sensor means for sensing an increase in pressure after said known quantity of fluid is filtered through a filter medium, said cycle end sensor means shutting off any vacuum means in response to said increase in pressure.

30. A filtering apparatus as claimed in claim 29 including a round inlet funnel, a coarse metering means comprising a mark in said round inlet funnel, said round inlet funnel being connected to said measuring means, a cover for said round inlet funnel, and said rinse means including an injection port angled to swirl rinse fluid in said round inlet funnel and into said measuring means.

31. A filtering apparatus as claimed in claim 30 wherein said rinse means further includes a rinse fluid holding tank for supplying rinse fluid during a rinse cycle and means for ceasing the flow of rinse fluid if said cover is removed during a rinse cycle.

32. A filtering apparatus comprising:
a slidable carrier having means to hold a filter medium,
means to prevent said slidable carrier from moving during filtering,
a filter medium support,
a measuring means having an open end for engaging a filter medium and an overflow passage to remove any excess fluid placed in said measuring means,
said measuring means having a known volume for receiving and holding a known quantity of fluid between said open end when in engagement with a filter medium and said overflow passage,
means to move said measuring means into and out of engagement with a filter medium,
means to apply a vacuum to said filter support,
said means to apply a vacuum including a waste means to receive fluid drawn through said filter medium,
a moat surrounding said filter support and positioned below said filter support,
said moat having means for receiving excess fluid from said overflow passage in said measuring means and for receiving at least a portion of said known quantity of fluid positioned above a filter medium in said measuring means in the event said portion of known quantity of fluid is unable to pass through a filter medium and must be released,
said moat including an outlet and an outlet valve to drain any fluid in said moat to said vacuum means,
means to release fluid through said outlet valve when said measuring means is moved out of engagement with a filter medium whereby excess fluid in said moat is transmitted through said outlet valve to said vacuum means,
an inlet funnel for receiving an input of fluid and transmit said fluid into said measuring means,
a removable cover adapted to cover an input opening in said inlet funnel,
means preventing removal of said cover unless said measuring means is in engagement with a filter medium,
rinse means for rinsing said filtering apparatus with rinse fluid after said known quantity of fluid is filtered through a filter medium,
said rinse means having means to project fluid to transport any residual fluid on a wall of said measuring means to a filter medium while said measuring means is still in engagement with a filter medium, and
an injection port in said inlet funnel adapted to swirl rinse fluid in said inlet funnel and into said measuring means,
whereby said filtering apparatus is designed to filter a quantitative amount of fluid and receive fluid in said moat which is excess sample fluid or fluid unwanted as a result of error or operational failure and which drains waste fluid into said waste means.

33. A filtering apparatus comprising:
a slidable carrier having means to hold a filter medium,
a filter medium support,
a measuring means having an opening for engaging a filter medium,
said measuring means having a known volume for receiving and holding a known quantity of fluid and having an overflow opening to remove any excess fluid placed in said measuring means,
means to move said measuring means into and out of engagement with a filter medium,
means to apply a vacuum to said filter support, and
means preventing addition of fluid into said measuring means unless said measuring means is in engagement with a filter medium,
said means preventing addition of fluid comprises a removable cover preventing the introduction of fluid into said measuring means and a mechanical interlock to prevent opening of said cover unless said measuring means is in engagement with said filter medium.

34. A filtering apparatus as claimed in claim 33 including:
a moat surrounding said filter support and positioned below said filter support,
said moat being positioned to receive excess fluid from said overflow opening in said measuring means and being positioned to receive at least a portion of said known quantity of fluid positioned above a filter medium in said measuring means in the event said portion of known quantity of fluid is unable to pass through a filter medium and must be released, and
said moat including an outlet and an outlet valve to drain any fluid in said moat to said vacuum.

* * * * *